US012802577B2

(12) United States Patent
Bode et al.

(10) Patent No.: US 12,802,577 B2
(45) Date of Patent: Nov. 17, 2026

(54) ROAAS RUNWAY ALIGNMENT INDICATIONS ON AIRPORT MOVING MAP

(71) Applicant: Rockwell Collins, Inc., Cedar Rapids, IA (US)

(72) Inventors: Carl H. Bode, Plankinton, SD (US); Jason K. Dahlstrom, Marion, IA (US); Michael J. Nielsen, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 178 days.

(21) Appl. No.: 18/531,449

(22) Filed: Dec. 6, 2023

(65) Prior Publication Data

US 2025/0191477 A1 Jun. 12, 2025

(51) Int. Cl.

| | |
|---|---|
| ***G08G 5/00*** | (2025.01) |
| ***B64D 45/04*** | (2006.01) |
| ***G01C 21/00*** | (2006.01) |
| ***G08G 5/21*** | (2025.01) |
| ***G08G 5/54*** | (2025.01) |

(52) U.S. Cl.

CPC ............... *G08G 5/54* (2025.01); *B64D 45/04* (2013.01); *G08G 5/21* (2025.01)

(58) Field of Classification Search

None

See application file for complete search history.

(56) References Cited

U.S. PATENT DOCUMENTS

| | | | | |
|---|---|---|---|---|
| 8,046,165 | B2 | 10/2011 | Sacle et al. | |
| 8,200,378 | B1 | 6/2012 | Chiew et al. | |
| 8,847,793 | B2 | 9/2014 | Ridenour et al. | |
| 9,041,560 | B2 | 5/2015 | Venkataswamy et al. | |
| 9,098,996 | B2 | 8/2015 | Barraci et al. | |
| 9,399,524 | B2 | 7/2016 | He et al. | |
| 9,573,698 | B1 | 2/2017 | He | |
| 10,214,300 | B2 | 2/2019 | Feyereisen et al. | |
| 10,748,435 | B2 | 8/2020 | Gadgil et al. | |
| 11,024,185 | B2 | 6/2021 | Turner et al. | |
| 11,282,400 | B2 | 3/2022 | Byxbe et al. | |
| 11,328,615 | B2 | 5/2022 | Schwindt | |
| 11,545,037 | B2 | 1/2023 | Byxbe et al. | |
| 2005/0128129 | A1 * | 6/2005 | Conner | G01S 19/15 342/36 |
| 2005/0261813 | A1 * | 11/2005 | Ryan | B64C 25/426 701/16 |
| 2008/0275642 | A1 * | 11/2008 | Clark | G09B 29/106 701/457 |
| 2011/0264313 | A1 | 10/2011 | Sampath | |
| 2013/0090841 | A1 | 4/2013 | Barraci et al. | |

(Continued)

OTHER PUBLICATIONS

European Search Report received in EP Application No. 24217590.9, Apr. 11, 2025, 8 pages.

*Primary Examiner* — Adam D Tissot
*Assistant Examiner* — Michael T Silva
(74) *Attorney, Agent, or Firm* — Suiter Swantz IP

(57) ABSTRACT

A flight display provides Runway Alignment Indications on an Airport Moving Map. The Runway Alignment Indications include Landing Runway Detection Zones on the Airport Moving Map for the crew-selected runway or the FMS arrival runway. The Landing Runway Detection Zones are geometrically sized, oriented, and placed in relation to the applicable landing runway approach thresholds.

14 Claims, 5 Drawing Sheets

238

(56) References Cited

U.S. PATENT DOCUMENTS

| | | | | |
|---|---|---|---|---|
| 2014/0097972 | A1* | 4/2014 | Barraci | G08G 5/26<br>340/971 |
| 2015/0112517 | A1* | 4/2015 | Conner | G08G 5/21<br>701/16 |
| 2015/0120098 | A1* | 4/2015 | Catalfamo | G08G 5/54<br>701/16 |
| 2015/0243174 | A1 | 8/2015 | Conner et al. | |
| 2017/0053539 | A1 | 2/2017 | Feyereisen et al. | |
| 2017/0320589 | A1* | 11/2017 | Moravek | G08G 5/21 |
| 2021/0221531 | A1 | 7/2021 | Kanagarajan et al. | |
| 2022/0101738 | A1* | 3/2022 | Ramachandra | G08G 5/54 |
| 2022/0343777 | A1 | 10/2022 | He et al. | |
| 2022/0358847 | A1 | 11/2022 | Subramaniyan et al. | |
| 2023/0386352 | A1* | 11/2023 | Nagonda | G08G 5/80 |
| 2025/0054398 | A1 | 2/2025 | Bode | |
| 2025/0054399 | A1 | 2/2025 | Bode | |

* cited by examiner

ROAAS RUNWAY ALIGNMENT INDICATIONS ON AIRPORT MOVING MAP

TECHNICAL FIELD

The present invention generally relates to aircraft indicators, and more specifically to landing aids.

BACKGROUND

Currently, flight displays lack of means of visualizing runway overrun awareness and alerting system (ROAAS) determined information during an approach procedure. It is difficult for flight crew to visualize where ROAAS alerts are anticipated to occur along the intended landing runway. Therefore, it would be advantageous to provide a device, system, and method that cures the shortcomings described above.

SUMMARY

A flight display is described, in accordance with one or more embodiments of the present disclosure. The flight display comprises a memory maintaining a flight display system application The flight display comprises one or more processors configured to execute the flight display system application. The flight display system application causes the flight display to receive an arrival airport, a plurality of runways associated with the arrival airport, and a first arrival runway from a runway overrun awareness and alerting system. The arrival airport and the first arrival runway are from a flight plan. The flight display system application causes the flight display to display the arrival airport, the plurality of runways associated with the arrival airport, and the first arrival runway. The flight display system application causes the flight display to receive a selection of a second arrival runway. The first arrival runway and the second arrival runway are each one of the plurality of runways associated with the arrival airport. The flight display system application causes the flight display to transmit the second arrival runway to the runway overrun awareness and alerting system. The flight display system application causes the flight display to receive an airport moving map from an airport moving map application. The flight display system application causes the flight display to receive at least a first detection zone from the runway overrun awareness and alerting system. The first detection zone is associated with an aligned runway. The aligned runway is one of the plurality of runways associated with the arrival airport. The flight display system application causes the flight display to display the airport moving map with the first detection zone overlaid on the airport moving map. The first detection zone is displayed relative to the aligned runway.

In some embodiments, the second arrival runway is not the first arrival runway.

In some embodiments, the aligned runway is the first arrival runway.

In some embodiments, the aligned runway is the second arrival runway.

In some embodiments, the aligned runway is not the first arrival runway or the second arrival runway.

In some embodiments, the aligned runway comprises an approach threshold.

The first detection zone is overlaid on the airport moving map starting from the approach threshold.

In some embodiments, the flight display system application causes the flight display to display a runway identifier associated with the aligned runway at a first end of the first detection zone which is opposed to a second end of the first detection zone which is disposed at the approach threshold.

In some embodiments, the first detection zone comprises a trapezoidal shape.

In some embodiments, the airport moving map is an overhead view of the arrival airport.

In some embodiments, the flight display system application causes the flight display to receive a plurality of detection zones and overlay the plurality of detection zones on the airport moving map.

In some embodiments, the plurality of detection zones are associated with at least the first arrival runway, the second arrival runway, and the aligned runway.

An aircraft is described, in accordance with one or more embodiments of the present disclosure. The aircraft comprises a flight display. The flight display comprises a memory maintaining a flight display system application. The flight display comprises one or more processors configured to execute the flight display system application. The flight display system application causes the flight display to receive an arrival airport, a plurality of runways associated with the arrival airport, and a first arrival runway from a runway overrun awareness and alerting system. The arrival airport and the first arrival runway are from a flight plan. The flight display system application causes the flight display to display the arrival airport, the plurality of runways associated with the arrival airport, and the first arrival runway. The flight display system application causes the flight display to receive a selection of a second arrival runway. The first arrival runway and the second arrival runway are each one of the plurality of runways associated with the arrival airport. The flight display system application causes the flight display to transmit the second arrival runway to the runway overrun awareness and alerting system. The flight display system application causes the flight display to receive an airport moving map from an airport moving map application. The flight display system application causes the flight display to receive at least a first detection zone from the runway overrun awareness and alerting system. The first detection zone is associated with an aligned runway. The aligned runway is one of the plurality of runways associated with the arrival airport. The flight display system application causes the flight display to display the airport moving map with the first detection zone overlaid on the airport moving map. The first detection zone is displayed relative to the aligned runway. The aircraft comprises a common computing module configured to execute the runway overrun awareness and alerting system.

In some embodiments, the aircraft comprises a second common computing module configured to execute a flight management system. The runway overrun awareness and alerting system is configured to receive the arrival airport from the flight plan via a flight management system.

In some embodiments, the aircraft comprises a navigation database. The runway overrun awareness and alerting system is configured to receive the plurality of runways associated with the arrival airport from the navigation database.

In some embodiments, the aircraft comprises a Synthetic Vision Module with Head Up Display configured to execute the airport moving map application.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
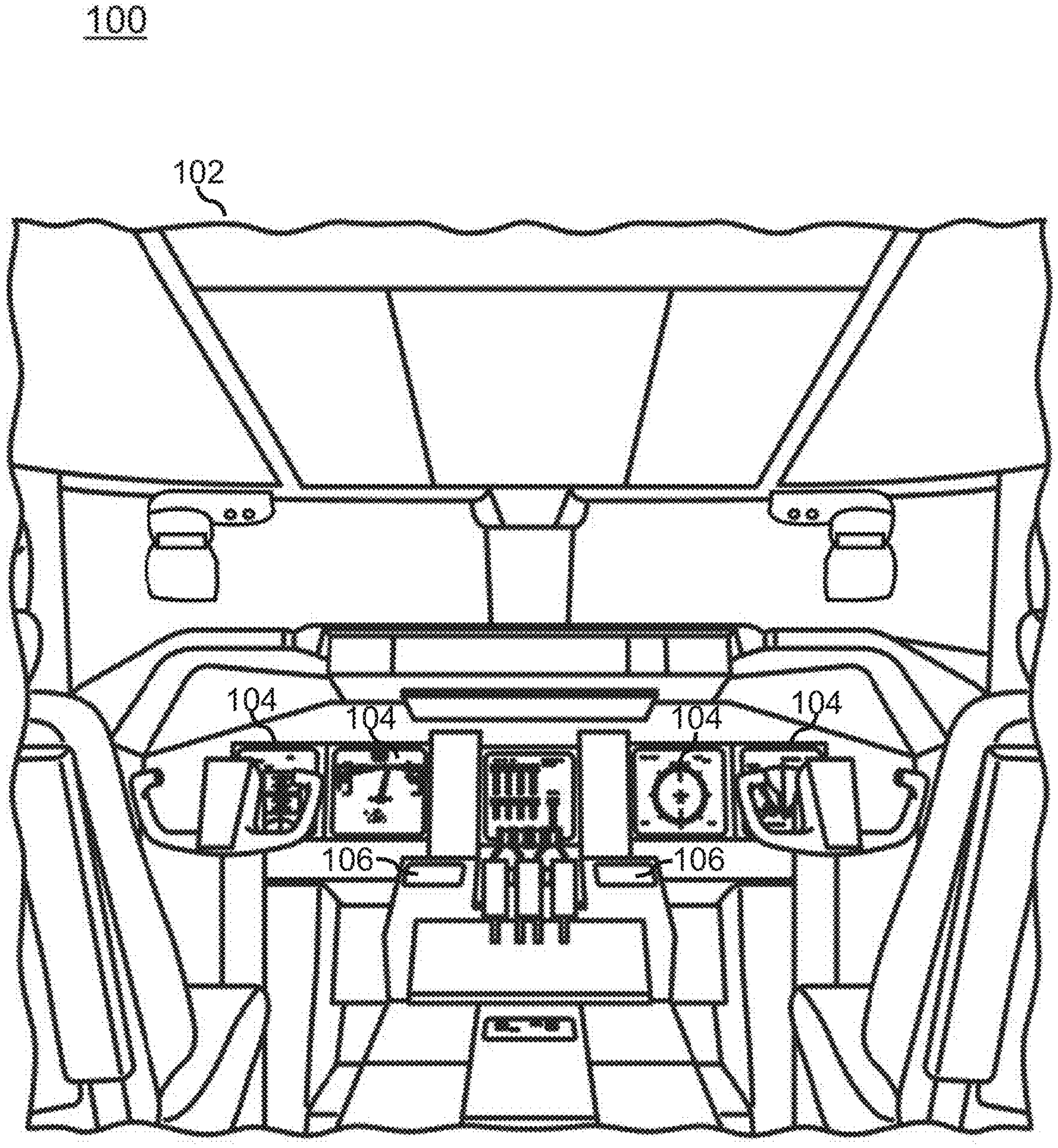
FIG. 1 depicts a schematic illustration of a cockpit of an aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a flight display. The flight display provides Runway Alignment Indications on an Airport Moving Map. The Runway Alignment Indications include Landing Runway Detection Zones on the Airport Moving Map for the crew-selected runway or the FMS arrival runway. The Landing Runway Detection Zones are geometrically sized, oriented, and placed in relation to the applicable landing runway approach thresholds.

U.S. Patent Publication Number US20050128129A1, titled "Ground operations and imminent landing runway selection"; U.S. patent application Ser. No. 18/233,087, titled "System And Method To Display View Of Airport Moving Map Depicting Runway Overrun Awareness And Alerting System (ROAAS)-Based Indicators"; U.S. patent application Ser. No. 18/233,072, titled "System And Method To Generate And Display Runway Overrun Awareness And Alerting System (ROAAS) Image Depicting Current Runway Displaced Threshold Value And Current Landing Distance Available Value"; are incorporated herein by reference in the entirety.

Referring to FIG. 1, a schematic illustration of a cockpit 102 of an aircraft 100 is described, according to an exemplary embodiment of the inventive concepts disclosed herein. The cockpit 102 may include one or more flight displays 104 and one or more user interface ("UI") elements 106. The flight displays 104 may be implemented using any of a variety of display technologies, including CRT, LCD, organic LED, dot matrix display, and others. The flight displays 104 may be navigation (NAV) displays, primary flight displays, electronic flight bag displays, tablets, synthetic vision system displays, head up displays (HUDs) with or without a projector, and the like. The flight displays 104 may be used to provide information to the flight crew, thereby increasing visual range and enhancing decision-making abilities. One or more of the flight displays 104 may be configured to function as, for example, a primary flight display (PFD) used to display altitude, airspeed, vertical speed, and navigation and traffic collision avoidance system (TCAS) advisories. One or more of the flight displays 104 may also be configured to function as, for example, a multi-function display used to display navigation maps, weather radar, electronic charts, TCAS traffic, aircraft maintenance data and electronic checklists, manuals, and procedures. One or more of the flight displays 104 may also be configured to function as, for example, an engine indicating and crew-alerting system (EICAS) display used to display critical engine and system status data. Other types and functions of the flight displays 104 are contemplated as well. According to various exemplary embodiments of the inventive concepts disclosed herein, at least one of the flight displays 104 may be configured to provide a rendered display from the systems and methods of the present disclosure.

In some embodiments, the flight displays 104 may provide an output based on data received from a system external to an aircraft, such as a ground-based weather radar system, satellite-based system, or from a system of another aircraft.

In some embodiments, the flight displays 104 may provide an output from an onboard aircraft-based radar system, LIDAR system, infrared system or other system on an aircraft. For example, the flight displays 104 may include a weather display, a weather radar map, and a terrain display. In some embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 106 may include, for example, dials, switches, buttons, touch screens, keyboards, a mouse, joysticks, cursor control devices (CCDs) or other multi-function key pads certified for use with avionics systems. The UI elements 106 may be configured to, for example, allow an aircraft crew member to interact with various avionics applications and perform functions such as data entry, manipulation of navigation maps, and moving among and selecting checklist items. For example, the UI elements 106 may be used to adjust features of the flight displays 104, such as contrast, brightness, width, and length. The UI elements 106 may also (or alternatively) be used by an aircraft crew member to interface with or manipulate the displays of the flight displays 104. For example, the UI elements 106 may be used by aircraft crew member to adjust the brightness, contrast, and information displayed on the flight displays 104. The UI elements 106 may additionally be used to acknowledge or dismiss an indicator provided by the flight displays 104. The UI elements 106 may be used to correct errors on the flight displays 104. Other UI elements 106, such as indicator lights, displays, display elements, and audio alerting devices, may be configured to warn of potentially threatening conditions such as severe weather, terrain, and obstacles, such as potential collisions with other aircraft.

Figure 2A:
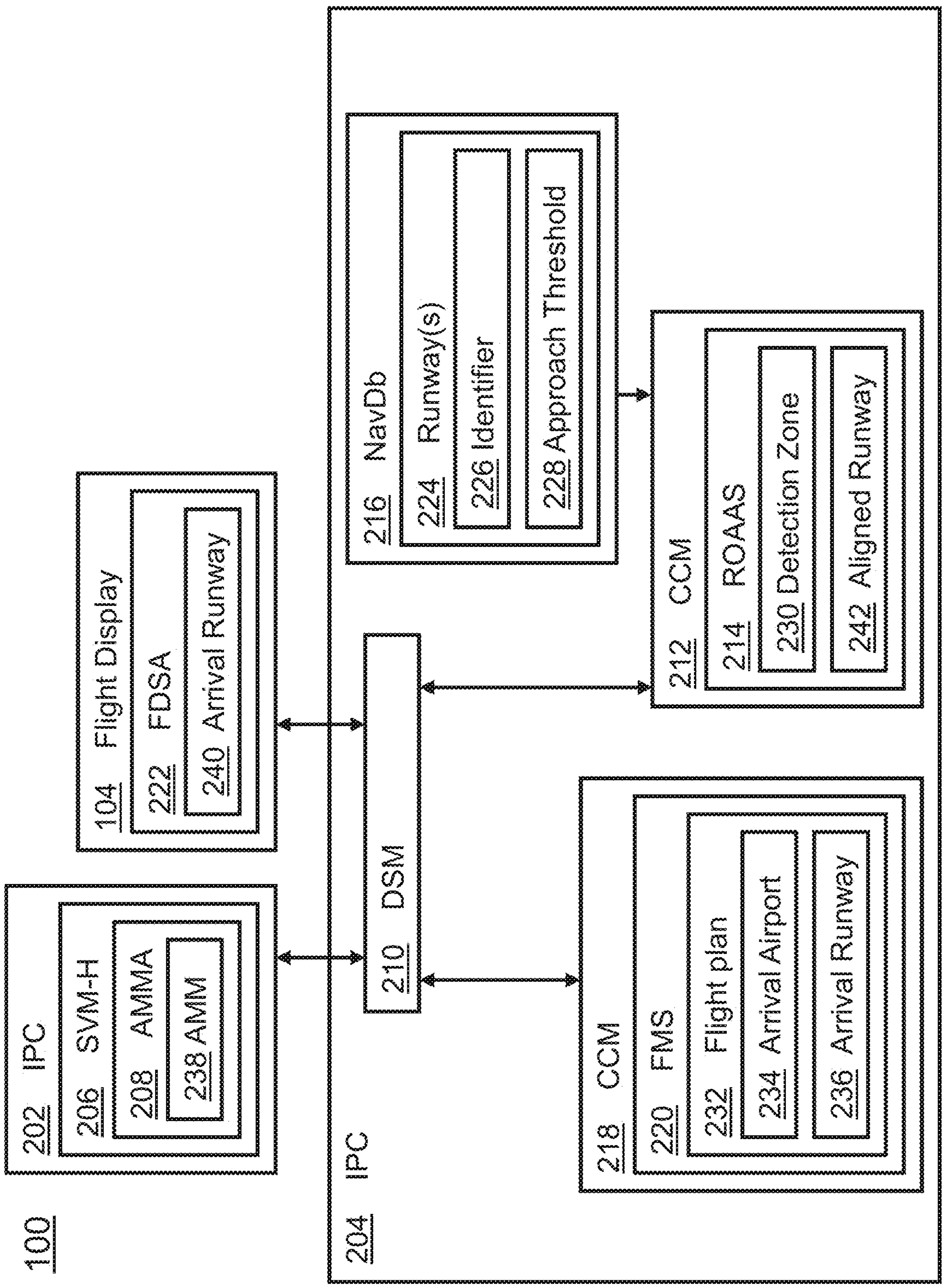
FIG. 2A depicts a block diagram of an aircraft, in accordance with one or more embodiments of the present disclosure.
Figure 2B:
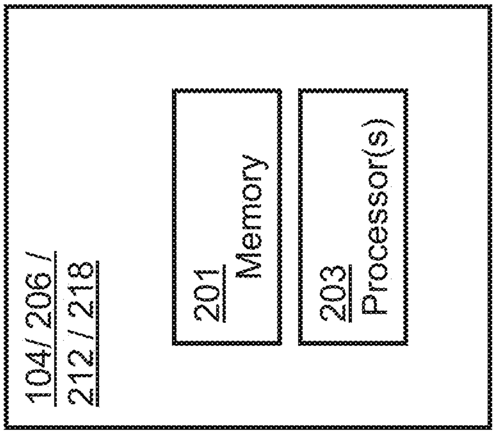
FIG. 2B depicts a block diagram of a flight display, Synthetic Vision Module with Head Up Display, and common computing modules, in accordance with one or more embodiments of the present disclosure.

Referring now to FIGS. 2A-2B, a block diagram of the aircraft 100 is described, in accordance with one or more embodiments of the present disclosure. The aircraft 100 may include one or more components, such as, but not limited to, flight display 104, integrated processing cabinets (IPC 202), IPC 204, Synthetic Vision Module with Head Up Display (SVM-H 206), a common computing module (CCM 212), a Runway Overrun Awareness and Alerting System (ROAAS 214), navigation database 216 (NavDb), a common computing module (CCM 218), a flight management system (FMS 220), an Airport Moving Map Application (AMMA 208), and the like.

In embodiments, the aircraft 100 includes navigation database 216. The navigation database 216 may also be referred to as an airport/runway database. The navigation database 216 may be maintained in memory. For example, the navigation database 216 may be maintained in memory of the IPC 204.

The navigation database 216 may include various data used for navigating the aircraft 100. For example, the navigation database 216 may include runways 224. The runways 224 may also be referred to as landing runways, arrival runways, and the like. The runways 224 may be associated with one or more airports. For example, the runways 224 may be associated with an arrival airport 234 along with various other airports. The runways 224 may include various data, such as, but not limited to, an identifier 226, an approach threshold 228, and the like.

Each of the runways 224 may include the identifier 226. The identifier 226 for the runways 224 may be based on the bearing of the runways 224. The bearing may refer to a compass bearing assigned to each runway. The bearing may be at 90 representing east, 180 representing south, 270 representing west, and 360 representing north. In some instances, the bearing may be shortened to two digits and rounded (e.g., 9 representing east, 18 representing south, 27 representing west, and 36 representing north). In this instance, the bearing may range from 1 to 36, although this is not intended to be limiting. The identifier 226 for the runways 224 may also be based on the location of the runways 224 relative to adjacent of the runways. For example, adjacent runways may be referred to as bearing-left (e.g., bearing-L) and bearing-right (e.g., bearing-R), respectively.

Each of the runways 224 may include the approach threshold 228. The approach threshold 228 may refer to a beginning of the runway 224. The approach threshold 228 may be stored as a coordinate (e.g., latitude and longitude).

In embodiments, the identifier 226 and/or the approach threshold 228 may be printed on the runways 224. The identifier 226 and/or the approach threshold 228 may be physically printed on the runway to visually assist the pilot during landing. For example, the identifier 226 may be printed as a set of block letters. By way of another example, the approach threshold 228 may be printed as threshold marking (e.g., a set of longitudinal stripes with a gap to indicate a centerline).

The navigation database 216 may further include various data associated with the runways 224, such as, but not limited to, an approach end, a runway start, a runway end (e.g., a physical end of the runway), a stop way; a runway length, a displaced threshold (e.g., a runway displaced threshold), a condition, and the like. The navigation database 216 may also include published instrument approach procedures (IAPs), ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and GNSS Landing Systems.

The navigation database 216 may be formatted according to one or more standards. In embodiments, the navigation database 216 may be compliant with one or more file format standards, such as, but not limited to, Aeronautical Radio, Incorporated ("ARINC") Specification-424.

In embodiments, the aircraft 100 includes CCM 218. The CCM 218 may be configured to run various software applications (e.g., a flight management system (FMS 220)) or computer code stored (e.g., maintained) in a non-transitory computer-readable medium. In embodiments, the CCM 218 may be configured to execute FMS 220. The CCM 218 may include a memory 201 maintaining the FMS 220 and one or more processors 203 configured to execute the FMS 220.

The FMS 220 may be executed by one or more processors 203 of the CCM 218 to perform any of the various functions of the FMS 220.

The FMS 220 may include a flight plan 232. For example, the flight plan 232 may be maintained in a memory of the CCM 218 and/or FMS 220. The flight plan 232 may include various data, such as, but not limited to, an arrival airport 234 and/or an arrival runway 236.

The arrival airport 234 may also be referred to as an FMS arrival airport. Similarly, the arrival runway 236 may also be referred to as an FMS arrival runway or a first arrival runway. The arrival airport 234 may be one of the runways 224 associated with the arrival airport 234. The aircraft 100 may or may not follow the flight plan 232 to the arrival runway 236. During a landing maneuver, an actual arrival runway to which the aircraft 100 lands may differ from the arrival runway 236.

In embodiments, the arrival runway 236 in the flight plan 232 may be updated in response to receiving a user input. For example, a pilot (e.g., captain, first officer) of the aircraft 100 may change the arrival runway 236. However, manually changing the flight plan 232 during landing may be undesirable due to increasing a work-load of the pilot.

In embodiments, the aircraft 100 includes a Synthetic Vision Module with Head Up Display (SVM-H 206). The SVM-H 206 may be configured to execute an Airport Moving Map Application (AMMA 208). The AMMA 208 may be configured to generate an airport moving map (AMM 238). The SVM-H 206 may include a memory 201 maintaining the AMMA 208 and one or more processors 203 configured to execute the AMMA 208. The AMMA 208 may be executed by one or more processors 203 of the SVM-H 206 to perform any of the various functions of the AMMA 208.

The AMM 238 may be a computer-generated image. The AMM 238 may be a two-dimensional image. The AMM 238 may be an overhead view (e.g., directly overhead view) of the arrival airport 234. The AMM 238 may depict a location of the aircraft 100 relative to the arrival airport 234. For example, the AMM may be an overhead view depicting the aircraft and a surrounding map. For instance, the AMM 238 may include a depiction of the aircraft 100 (e.g., a location (e.g., a current location) of the aircraft 100 (e.g., aircraft 100 performing an approach procedure) relative to the arrival airport 234), the runways 224 associated with the arrival airport 234, and the like. The AMM 238 may be a high-resolution map image which shows airport runways, taxiway images, and the like. The AMM 238 may be geo-referenced. In this regard, the AMM 238 may automatically scroll with movement of the aircraft 100 in real time.

The AMM 238 may include a map range. The AMM 238 may provide a given level of detail within the map based on a selected map range. For example, the AMM 238 may automatically declutter or clutter map details based on the selected map range. The AMM 238 may allow for a variety of map ranges (e.g., the higher the map range, the more zoomed out the map is) to be used for operations during an approach procedure; for example, in some embodiments, the map range be between 1,000 feet and 6,000 feet (e.g., between 2,000 feet and 4,000 feet, such as 3,000 feet). Currently, flight crews often use AMM 238 map ranges of 2 nautical miles (NM) or greater for in-air flight phases.

In embodiments, the AMMA 208 provides the AMM 238 to the FDSA 222 when the aircraft 100 is within a map range of the AMM 238. The map range may be less than two nautical miles. The AMMA 208 may determine that the aircraft 100 has reached a predetermined height (e.g., between 300 feet and 1,500 feet (e.g., between 600 feet and 1,000 feet, such as 750 feet)) above a ROAAS threshold for the runway during the approach procedure; and/or in response to the determination that the aircraft has reached the predetermined height above the runway, output the view of the AMM 238 as the graphical data.

In embodiments, the aircraft 100 includes flight display 104. The flight display 104 may be configured to run various software applications (e.g., a flight display system application (FDSA 222)) or computer code stored (e.g., maintained) in a non-transitory computer-readable medium. In embodiments, the flight display 104 may be configured to execute a Flight Display System Application (FDSA 222). The FDSA 222 may be hosted within the flight display 104. The flight display 104 may include a memory 201 maintaining FDSA 222 and one or more processors 203 configured to execute the FDSA 222. The FDSA 222 may be executed by one or more processors 203 of the flight display 104 to perform any of the various functions of the FDSA 222.

In embodiments, the AMMA 208 may provide the AMM 238 to the FDSA 222. The FDSA 222 may receive the AMM 238 from the FDSA 222. The FDSA 222 may display the AMM 238 on the flight display 104. In embodiments, the FDSA 222 is configured to cause the flight display 104 to display the AMM 238. The flight display 104 may output the view of the AMM 238 as graphical data. The at least one display may be configured to display the view of the AMM 238. The flight display 104 may be configured to generate a view of the AMM 238 depicting the aircraft 100 relative to the arrival runway 236, the arrival runway 240, and/or the aligned runway 242. The FDSA 222 may also draw an own aircraft symbol on the AMM 238 based on the geo-reference of the AMM 238 and the geo-reference of the aircraft 100. The own aircraft symbol may define where the aircraft 100 is in relation to the AMM 238.

In embodiments, the aircraft 100 includes a common computing module (CCM 212). The CCM 212 may be configured to execute a Runway Overrun Awareness and Alerting System (ROAAS 214). The CCM 212 may include a memory 201 maintaining program instructions and one or more processors 203 configured to execute the program instructions. The ROAAS 214 may be executed by one or more processors 203 of the CCM 212 to perform any of the various functions of the ROAAS 214.

In embodiments, the ROAAS 214 facilitates data flow from FMS 220 into FDSA 222 to populate a ROAAS Runway Control, accepts selections, and echoes the confirmation to the FDSA 222.

The ROAAS 214 may have access to and/or determine any of the information from the navigation database 216. For example, the ROAAS 214 may access the runways 224 associated with the arrival airport 234 from the navigation database 216. In embodiments, the FDSA 222 may be configured to receive the runways 224 associated with the arrival airport 234 from the ROAAS 214. The FDSA 222 may transmit the runways 224 associated with the arrival airport 234 to cause the flight display 104 to display said runways.

In embodiments, the FDSA 222 may receive a selection of an arrival runway 240. The arrival runway 240 may also be referred to as a FDSA-selected arrival runway, crew-selected arrival runway, an intended landing runway, a second arrival runway, and the like. The arrival runway 240 may be one of the runways 224 associated with the arrival airport 234 which are displayed on the flight display 104. The arrival runway 240 may or may not be the arrival runway 236. The FDSA 222 thus enables the pilots to change the arrival runway 240 from the arrival runway 236 maintained in the flight plan 232 based on the current conditions of the flight. The FDSA 222 may transmit the arrival runway 240 to the ROAAS 214.

In embodiments, the ROAAS 214 may include detection zones 230. Each of the runways 224 may be associated with one of the detection zones 230. The detection zones 230 may also be referred to as a landing zone, an approach zone, a landing runway detection zone, and the like. The detection zones 230 may start from the approach threshold 228. The detection zones 230 may be centered on the centerline of the runway 224. The detection zones 230 may extend from the approach threshold 228 for a given distance. The detection zones 230 may be a geometric shape. In embodiments, the detection zones 230 may include a trapezoidal shape. The trapezoidal shape may include a first end and a second end. The first end of the trapezoid may be widest. The second end of the trapezoid may be narrowest and disposed at the approach threshold 228.

In embodiments, the ROAAS 214 may determine an aligned runway 242. The aligned runway 242 may also be referred to as a ROAAS-selected landing runway. The aligned runway 242 may be one of the runways 224 associated with the arrival airport 234. For example, the aligned runway 242 may be the arrival runway 236, the arrival runway 240, or another of the runways 224 associated with the arrival airport 234. Thus, the aligned runway 342 may or may not be the arrival runway 236 or the arrival runway 340. In embodiments, the ROAAS 214 may determine the aircraft 100 is aligned to the aligned runway 242 based on a heading of the aircraft 100.

The ROAAS 214 may determine the aligned runway 242 as part of one or more alerting algorithms. In embodiments, the ROAAS 214 may determine whether the aircraft 100 is aligned for landing on each of the runways 224 associated with the arrival airport 234. Below 750 ft, ROAAS 214 starts checking if the aircraft 100 is headed in the direction toward the runways 224 associated with the arrival airport 234 and within the bounds of the detection zones 230. The ROAAS 214 may output one or more flags indicating whether the aircraft 100 is landing on the arrival runway 236, arrival runway 240, another of the runways 224 associated with the arrival airport 234, or an unknown surface. For example, the ROAAS 214 may mark one of the runways 224 associated with the arrival airport 234 as the aligned runway 242 when all of the following are true: the aircraft 100 height is at or below 750 ft; the ROAAS 214 State is Ready or In Air; the aircraft 100 is oriented in the direction of the runway; and any of the following is true: the aircraft 100 is inside of the detection zone 230 or the projected flight path of the aircraft 100 intersects the extended runway threshold in the direction of the runway heading. A ROAAS state is ready or in air may refers to a state machine within the ROAAS 214 used to determine when the ROAAS 214 is available to provide overrun alerts. Ready or in air may have to do with the position, heading, and track of the aircraft 100 in relation a centerline of the runways 224. Ready may mean the ROAAS 214 knows the aircraft 100 is in the vicinity of the arrival airport 234 and when the aircraft 100 is within range of the approach threshold 228.

The ROAAS 214 may flag to the FDSA 222 which of the detection zones 230 is associated with the aligned runway 242. The flags output by the ROAAS 214 may indicate whether the aircraft 100 is landing on the 236, the arrival runway 240, another of the runways 224 associated with the arrival airport 234, or an unknown surface. The flags output by the ROAAS 214 may or may not be displayed to the flight crew. The ROAAS 214 flags for the aligned runway 242 may be transparent to the flight crew. This may result in confusion within the flight deck when the ROAAS 214 is indicating a ROAAS unavailable condition (no detected landing runway) or misleading alerting occurs (alerting based upon a different runway than what the crew was expecting). For example, these conditions are more prevalent when the arrival airport 234 contains several runways with the approach threshold within proximity to each other, when the crew is performing circle to land maneuvers or side step maneuvers. In this example, the detection zones 230 may overlap.

In embodiments, the ROAAS 214 may be configured to determine, generate, and/or obtain runway overrun awareness and alerting system (ROAAS) data associated with an approach procedure being performed by the aircraft 100 toward one or more of the runways 224. The ROAAS 214 may be configured to determine, generate, and/or obtain runway overrun awareness and alerting system (ROAAS) data associated with an approach procedure being performed by the aircraft 100 toward any of the arrival runway 236, the arrival runway 240, and/or the aligned runway 242. For example, the ROAAS 214 may provide overrun alerting for the aligned runway 242. The ROAAS provides runway overrun and alerting based on the aligned runway 242 because the aircraft 100 is likely to land on the aligned runway 242. The flight crew may see alerts on the flight display 104 for a runway overrun and change the energy state of the aircraft 100 to reduce the risk of overrunning the runway.

The ROAAS 214 may determine the aligned runway 242 without requiring a pilot to update the arrival runway 236 or the arrival runway 240. However, the aligned runway 242 may be different than the arrival runway 236 and the arrival runway 240. Therefore, the pilot may be confused as to which of the runways 224 the ROAAS 214 is providing alerting without further receiving information from the ROAAS 214.

In embodiments, the ROAAS 214 may send the detection zones 230 associated with the arrival runway 236, the arrival runway 240, and/or the aligned runway 242 to the FDSA 222. For example, the ROAAS 214 may send the latitude and longitude for the four corners of the detection zones 230. The FDSA 222 may receive the detection zones 230 associated with the arrival runway 236, the arrival runway 240, and/or the aligned runway 242 from the ROAAS 214.

The flight display 104 may be configured to display the detection zones 230 associated with the arrival runway 236, the arrival runway 240, and/or the aligned runway 242. For example, the FDSA 222 may cause the flight display 104 to display the detection zones 230 associated with the arrival runway 236, the arrival runway 240, and/or the aligned runway 242 on the AMM 238. The detection zones 230 may be displayed relative to the associated arrival runway 236, the arrival runway 240, and/or the aligned runway 242. The detection zones 230 may be geometrically sized, oriented, and placed in relation to the approach thresholds 228. For example, the detection zones 230 may be displayed starting from the approach threshold 228 of the associated arrival runway 236, the arrival runway 240, and/or the aligned runway 242. The detection zones 230 may be provided as a trapezoid shape on the AMM 238. The trapezoid shapes may be overlaid or imposed on the AMM 238. The detection zones 230 may provide a visual indication on the AMM 238 which runway the aircraft 100 is aligned to provide the crew with a better situation awareness. It is contemplated that displaying the detection zones 230 may be helpful in airports with runways which are aligned in parallel and are adjacent. Crew situational awareness may be enhanced with the detection zones 230 displayed in relation to the runways 224 and aircraft symbol placed on the AMM 238.

In embodiments, the FDSA 222 may cause the flight display 104 to overlay one or more of the detection zones 230 on the AMM 238. For example, the flight display 104 may overlay the detection zones 230 on the AMM 238 for each of the arrival runway 236, the arrival runway 240, and/or the aligned runway 242. In this regard, the flight display 104 may display one of the detection zones 230 for the arrival runway 236, one of the detection zones 230 for the arrival runway 240, and/or one of the detection zones 230 for the aligned runway 242. For instance, the flight display 104 may receive at least a first detection zone from the ROAAS 214, where the first detection zone is associated with the aligned runway 242, and display the AMM 238 with the first detection zone overlaid on the AMM 238, where the first detection zone is displayed relative to the aligned runway 242. By way of another instance, the flight display may receive a plurality of the detection zones 230 and overlay the plurality of detection zones 230 on the AMM 238, where the plurality of the detection zones 230 are associated with at least the arrival runway 236, the arrival runway 240, and/or the aligned runway 242.

In embodiments, the FDSA 222 may highlight the detection zone 230 associated with the aligned runway 242. For example, an emphasized border may be placed around the detection zone 230 associated with the aligned runway 242 to visually identify which runway the ROAAS is performing its alerting algorithms. No border may be placed around the detection zones 230 if the aircraft 100 is not aligned.

In embodiments, the detection zones 230 are displayed with one or more translucent color shades. The translucent color shades of the detection zones 230 provide quick identification for which type of detection zone is depicted on the AMM 238. In embodiments, the detection zone 230 associated with the arrival runway 236 may be displayed with a magenta color. In embodiments, the detection zone 230 associated with the arrival runway 240 may be displayed with a cyan color. In embodiments, the own ship symbol of the aircraft 100 may be colored with magenta or cyan when aligned with the corresponding detection zone.

In embodiments, the runway identifier 226 are displayed at the base of the detection zone 230. The runway identifier may help the flight crew relate the detection zone 230 to the associated runway 224. For example, the runway identifier 226 are displayed at a first end of the detection zone 230 which is opposed to a second end of the detection zone 230 disposed at the approach threshold 228.

In embodiments, the aircraft 100 may include a digital switch module (DSM 210). The DSM 210 may include Avionics Full Duplex Switched Ethernet (AFDX). AFDX communication between the systems is managed through the DSM 210 which resides in the IPC 204. The DSM 210 may be configured to route data (e.g., graphical data and/or ROAAS data). The DSM 210 may route various data between the AMMA 208, the FMS 220, the ROAAS 214, and the FDSA 222. For example, the DSM 210 may provide the AMM 238 from the AMMA 208 to the FDSA 222. By way of another example, the DSM 210 may provide the detection zones 230 from the ROAAS 214 to the FDSA 222.

Some or all of the SVM-H 206, the AMMA 208, the DSM 210, the CCM 212, the ROAAS 214, the navigation database 216, the CCM 218, and/or the FMS 220 may be contained in one or more integrated processing cabinets (IPCs). In embodiments, the IPC 202 include the SVM-H 206 and the AMMA 208. In embodiments, the IPC 204 includes the DSM 210, the CCM 212, the ROAAS 214, the navigation database 216, the CCM 218, and/or the FMS 220. The AMMA 208 may be hosted on the SVM-H 206 which may resides in IPC 202. The ROAAS 214 may be hosted on the CCM 212 which resides in IPC 204. The FMS 220 may be hosted on CCM 218 which resides in IPC 204.

Figure 3:
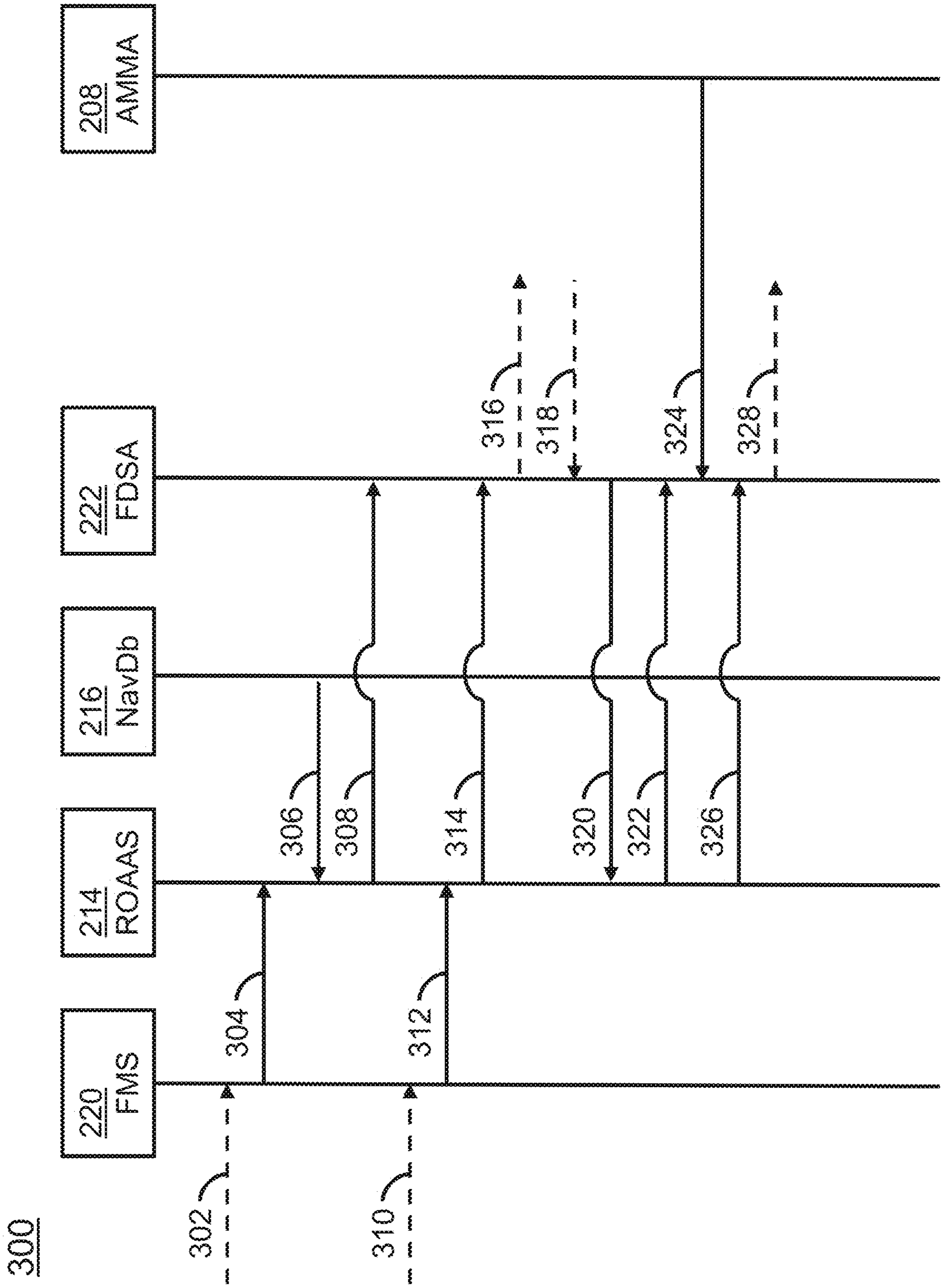
FIG. 3 depicts a timing diagram of a method, in accordance with one or more embodiments of the present disclosure.

Referring to FIG. 3, a timing diagram of a method 300 is described, in accordance with one or more embodiments of the present disclosure. The method 300 shows the data flow between the various applications of the aircraft 100. The embodiments and the enabling technology described previously herein in the context of the aircraft 100 should be interpreted to extend to the method 300. For example, the method 300 may be implemented by the aircraft 100.

In a step 302, the FMS 220 may enter the arrival airport 234 in the flight plan 232. For example, the FMS 220 may enter the arrival airport 234 in the flight plan 232 when setting up the flight plan 232 in the FMS 220. For instance, the arrival airport 234 may be entered during pre-flight by a pilot. The FMS 220 may receive the arrival airport 234 via the UI elements 106, or the like. For example, the FMS 220 may receive the arrival airport 234 on one or more user interface pages of the FMS 220. The FMS 220 may include a dialogue box to define the arrival airport 234.

In a step 304, the FMS 220 may transmit the arrival airport 234 to the ROAAS 214. Thus, ROAAS 214 receives the arrival airport 234 from the flight plan 232 via the FMS 220.

In a step 306, the ROAAS 214 may receive the runways 224 associated with the arrival airport 234 from the navigation database 216. For example, the ROAAS 214 may query the navigation database 216 for the runways 224 associated with the arrival airport 234. The ROAAS 214 may or may not retrieve runways associated with other airports in the navigation database 216.

In a step 308, the ROAAS 214 may transmit the arrival airport 234 and the runways 224 associated with the arrival airport 234 to the FDSA 222. The runways 224 associated with the arrival airport 234 may include a list of all runways, lengths, and the like. The FDSA 222 may use the arrival airport 234 to populate a Runway Control dialogue box.

In a step 310, the FMS 220 may enter the arrival runway 236 in the flight plan 232. For example, the FMS 220 may enter the arrival runway 236 in the flight plan 232 when setting up the flight plan 232 or after the flight plan 232 is set up. For example, the arrival runway 236 may be entered during pre-flight or during flight. In this regard, the FMS 220 may enter the arrival runway 236 in the flight plan 232 concurrent with or after entering the arrival airport 234 in the flight plan 232. The FMS 220 may receive the arrival runway 236 via the UI elements 106, or the like. For example, the FMS 220 may receive the arrival runway 236 on one or more user interface pages of the FMS 220. The FMS 220 may include a dialogue box to define the arrival runway 236.

In a step 312, the FMS 220 may transmit the arrival runway 236 to the ROAAS 214. Thus, ROAAS 214 may receive the arrival runway 236 from the flight plan 232 via the FMS 220. For example, the FMS 220 may provide flight plan information of the intended landing runway.

In a step 314, the ROAAS 214 may transmit the arrival runway 236 to the FDSA 222. The FDSA 222 may cause the flight display 104 to receive the arrival runway 236 from the ROAAS 214.

In a step 316, the FDSA 222 may cause the flight display 104 to display the arrival airport 234, the arrival runway 236, and the runways 224 associated with the arrival airport 234. For example, the flight display 104 may display a Runway Control dialogue box. The FDSA 222 may use both the arrival airport 234, the arrival runway 236, and the runways 224 associated with the arrival airport 234 to populate the Runway Control dialogue box. The FDSA 222 may cause the flight display 104 to display the Runway Control dialogue box, including the runways 224 associated with the arrival airport 234. For example, the runways 224 associated with the arrival airport 234 may be depicted as a drop-down box on the Runway Control dialogue box. A pilot may then select any of the runways 224 associated with the arrival airport 234 using the Runway Control dialogue box. The arrival runway 236 may be preloaded as an initial entry in the drop-down box. The runways 224 associated with the arrival airport 234 may be the other options of the drop-down box.

In a step 318, the FDSA 222 may cause the flight display 104 to receive a selection of the arrival runway 240. The arrival runway 240 is one of the runways 224 associated with the arrival airport 234. The arrival runway 240 may or may not be the arrival runway 236 in the flight plan 232. The FDSA 222 may receive the selection of the arrival runway 240 from the Runway Control dialogue box. For example, the pilot may select the arrival runway 240 via the Runway Control dialogue box. Thus, the FDSA 222 allows the pilot to select arrival runway 240 which are different than the arrival runway 236 the flight plan 232.

The FDSA 222 may also cause the flight display 104 to receive various data associated with the arrival runway 240. For example, the FDSA may receive one or more conditions, offsets, Localizer directional aides (LDA), and the like.

In a step 320, the FDSA 222 may cause the flight display 104 to transmit the arrival runway 240 to the ROAAS 214. The FDSA may also transmit the various data associated with the arrival runway 240, such as, but not limited to, the conditions, offsets, LDA, and the like. The ROAAS 214 receives the arrival runway 240 and the data associated with the arrival runway 240.

In a step 322, the ROAAS 214 may transmit an acknowledgement to the FDSA 222 indicating the arrival runway 240 and the LDA is accepted.

In a step 324, the AMMA 208 may transmit the AMM 238 to the FDSA 222. The FDSA 222 may cause the flight display 104 to receive the AMM 238 from the AMMA 208.

In a step 326, the ROAAS 214 may transmit the detection zones 230 associated with the arrival runway 236, the arrival runway 240, and/or the aligned runway 242 to the FDSA 222. The ROAAS 214 may transmit the coordinates associated with the corners of the detection zones 230 to the FDSA 222. For example, the FDSA 222 may cause the flight display 104 to receive at least a first detection zone. The first detection zone is associated with the aligned runway 242. For instance, the aligned runway 242 may be one of the arrival runway 236 or the arrival runway 240. By way of another example, the FDSA 222 may cause the flight display 104 to receive a second detection zone which is associated with the arrival runway 236 or the arrival runway 240.

In a step 328, the FDSA 222 may cause the flight display 104 to display the AMM 238 with the detection zones 230 overlaid on the AMM 238. For example, the FDSA 222 may superimpose the detection zones 230 over the AMM 238.

Figure 4:
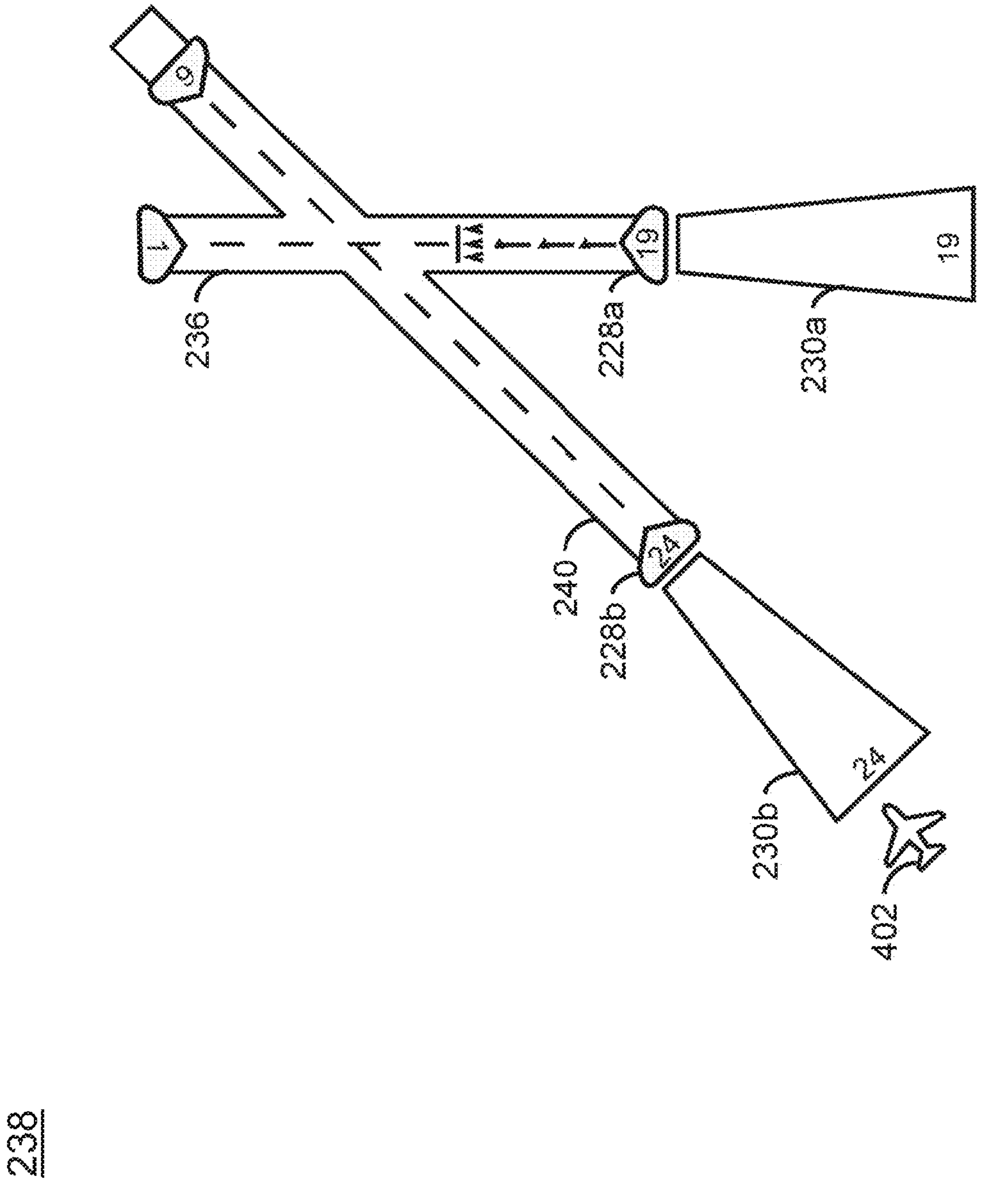
FIG. 4 depicts an exemplary airport moving map, in accordance with one or more embodiments of the present disclosure.

Referring to FIG. 4, an exemplary view of the AMM 238 is described, in accordance with one or more embodiments of the present disclosure. The AMM 238 depicts the arrival runway 236, a first approach threshold 228*a* associated with the arrival runway 236, a first detection zone 230*a* associated with the arrival runway 236, the arrival runway 240, a second approach threshold 228*b* associated with the arrival runway 240, a second detection zone 230*b* associated with the arrival runway 240, and an own aircraft symbol 402 associated with a position of the aircraft 100. The first detection zone 230*a* is placed at the first approach threshold 228*a*. The second detection zone 230*b* is placed at the second approach threshold 228*b*. The runway identifiers 226 (e.g., runway 24, runway 19) of the detection zones 230 are placed at the base of the first detection zone 230*a* and the second detection zone 230*b*. In this example, the projected track of the aircraft 100 intersects with the second approach threshold 228*b* associated with the arrival runway 240. Thus, the aligned runway 242 is the arrival runway 240. The arrival runway 240 is thus highlighted with an outline.

Referring generally again to the figures. The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A flight display comprising:

a memory maintaining a flight display system application; and one or more processors configured to execute the flight display system application causing the flight display to:

receive an arrival airport, a plurality of runways associated with the arrival airport, and a first arrival runway from a runway overrun awareness and alerting system; wherein the arrival airport and the first arrival runway are from a flight plan;

display the arrival airport, the plurality of runways associated with the arrival airport, and the first arrival runway;

receive a selection of a second arrival runway; wherein the first arrival runway and the second arrival runway are each one of the plurality of runways associated with the arrival airport;

transmit the second arrival runway to the runway overrun awareness and alerting system;

receive an airport moving map from an airport moving map application; wherein the airport moving map is an overhead view of the arrival airport;

receive at least a first detection zone from the runway overrun awareness and alerting system; wherein the first detection zone is associated with an aligned runway; wherein the aligned runway is one of the plurality of runways associated with the arrival airport; and display the airport moving map with the first detection zone overlaid on the airport moving map; wherein the first detection zone is displayed relative to the aligned runway; wherein the aligned runway comprises an approach threshold disposed at a beginning of the aligned runway; wherein the first detection zone is overlaid on the airport moving map starting from the approach threshold and extending away from the aligned runway in a trapezoidal shape having a first end and a second end; wherein the flight display system application causes the flight display to display a runway identifier associated with the aligned runway at the approach threshold and separately at the first end of the first detection zone; wherein the first end is a beginning of the first detection zone; wherein the first end is opposed to the second end of the first detection zone; wherein the second end is disposed at the approach threshold; wherein the first end is wider than the second end.

2. The flight display of claim 1, wherein the second arrival runway is not the first arrival runway.

3. The flight display of claim 2, wherein the aligned runway is the first arrival runway.

4. The flight display of claim 2, wherein the aligned runway is the second arrival runway.

5. The flight display of claim 2, wherein the aligned runway is not the first arrival runway or the second arrival runway.

6. The flight display of claim 1, wherein the flight display system application causes the flight display to receive a plurality of detection zones and overlay the plurality of detection zones on the airport moving map.

7. The flight display of claim 6, wherein the plurality of detection zones are associated with at least the first arrival runway, the second arrival runway, and the aligned runway.

8. A system for an aircraft, the system comprising:

a flight display comprising:

a memory maintaining a flight display system application; and one or more processors configured to execute the flight display system application causing the flight display to:

receive an arrival airport, a plurality of runways associated with the arrival airport, and a first arrival runway from a runway overrun awareness and alerting system; wherein the arrival airport and the first arrival runway are from a flight plan;

display the arrival airport, the plurality of runways associated with the arrival airport, and the first arrival runway;

receive a selection of a second arrival runway; wherein the first arrival runway and the second arrival runway are each one of the plurality of runways associated with the arrival airport;

transmit the second arrival runway to the runway overrun awareness and alerting system;

receive an airport moving map from an airport moving map application; wherein the airport moving map is an overhead view of the arrival airport;

receive at least a first detection zone from the runway overrun awareness and alerting system; wherein the first detection zone is associated with an aligned runway; wherein the aligned runway is one of the plurality of runways associated with the arrival airport; and display the airport moving map with the first detection zone overlaid on the airport moving map; wherein the first detection zone is displayed relative to the aligned runway; wherein the aligned runway comprises an approach threshold disposed at a beginning of the aligned runway; wherein the first detection zone is overlaid on the airport moving map starting from the approach threshold and extending away from the aligned runway in a trapezoidal shape having a first end and a second end; wherein the flight display system application causes the flight display to display a runway identifier associated with the aligned runway at the approach threshold and separately at the first end of the first detection zone; wherein the first end is a beginning of the first detection zone; wherein the first end is opposed to a second end of the first detection zone; wherein the second end is disposed at the approach threshold; wherein the first end is wider than the second end; and a common computing module configured to execute the runway overrun awareness and alerting system.

9. The system of claim 8, comprising a second common computing module configured to execute a flight management system; wherein the runway overrun awareness and alerting system is configured to receive the arrival airport from the flight plan via the flight management system.

10. The system of claim 8, comprising a navigation database; wherein the runway overrun awareness and alerting system is configured to receive the plurality of runways associated with the arrival airport from the navigation database.

11. The system of claim 8, comprising a Synthetic Vision Module with Head Up Display configured to execute the airport moving map application.

12. The flight display of claim 7, wherein the flight display system application draws an own aircraft symbol on the airport moving map based on a geo-reference of the airport moving map and a geo-reference of an aircraft; wherein the own aircraft symbol defines where the aircraft is in relation to the airport moving map; wherein the airport moving map automatically scrolls with movement of the aircraft in real time.

13. The flight display of claim 12, wherein the flight display system application highlights the first detection zone associated with the aligned runway.

14. The flight display of claim 13, wherein the own aircraft symbol is colored with a same color as respective of the plurality of detection zones when aligned with a corresponding detection zone.

* * * * *